UNITED STATES PATENT OFFICE 2,667,505

ALKYL ESTERS OF POLYHALOGENO-ALKENYL MALONIC ACIDS

Elbert C. Ladd and Merlin P. Harvey, Passaic, N. J., assignors to United States Rubber Company, New York, N. Y., a corporation of New Jersey No Drawing. Application November 9, 1951, Serial No. 255,726

3 Claims. (Cl. 260—485)

The invention relates to a new class of polyhalogenoalkenyl compounds having the formula

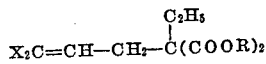

in which each X is fluorine, chlorine or bromine, and R is a lower alkyl radical, said compounds being the lower alkyl esters of alpha-ethyl-alpha-(3,3-dihalogeno-2-propenyl) malonic acids.

We have found new materials that can be readily synthesized by condensation of a 3,3-dihalogeno-2-propenyl halide with an ester of sodio ethylmalonic acid having the formula

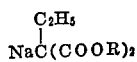

where R is lower alkyl. This reaction is as follows:

(1)
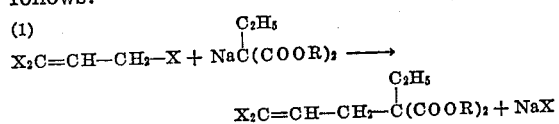

The 3,3-dihalogeno-2-propenyl halide starting materials are readily available through the selective and partial dehydrohalogenation of the corresponding 1,1,1,3-tetrahalogenopropanes which can be prepared in known manner by heating ethylene at 25°–120° C. with from 1 to 20 molar equivalents of a tetrahalogenomethane, in the presence of a free radical reaction initiator such as ultra-violet light or a peroxide compound, e. g., benzoyl peroxide. The fluorine compounds are best prepared by treatment of the corresponding chlorides or bromides with a fluorinating agent, e. g., SbF₃Cl₂.

Exemplary of the compounds of our invention is that prepared by the reaction of 1,1,3-trichloropropene with diethyl sodio ethylmalonate, represented as follows:

(2)
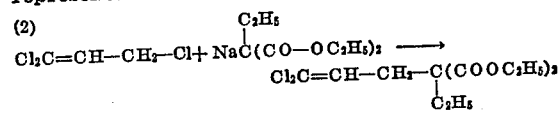

The new compounds of our invention are useful as solvents, as polymerization regulators, and as intermediates for the preparation of dyes, plasticizers, polymers, lube-oil additives and, especially, pharmaceuticals and agricultural chemicals.

The preparation of our new compounds is carried out by heating a mixture of the 1,1,3-trihalogenopropene and the ester of sodio ethylmalonic acid. In many cases, an excess of the sodio ethylmalonic ester will be used. Typically the molar ratio of the ester of sodio ethylmalonic acid to 1,1,3-trihalogenopropene will range from 1:1 to 1.5:1. The reactions proceed with unusual ease and speed. Hence only moderate heating, e. g., at temperatures of 50°–100° C., is ordinarily required and short reaction times in the range of 1–10 hours usually suffice. We prefer to carry out the reaction by refluxing the reaction mixture. A solubilizing diluent is preferably employed to facilitate the reaction by acting as a mutual solvent for the two reactants, as is common in chemical reactions where the reactants are not mutually soluble. Among the suitable diluents are the lower alkanols such as methanol, ethanol, propanol and butanol. The reaction products can be isolated from the reaction mixture by evaporation, filtration, extraction, crystallization and/or fractional distillation.

The following example discloses our invention in more detail. All parts are by weight.

Example

Sixteen and five-tenths parts of sodium are dissolved in about 315 parts of absolute ethanol, and to the resulting solution is added first 80 parts of diethyl ethylmalonate, whereby the diethyl ester of sodio ethylmalonic acid is formed, after which 72.69 parts of 1,1,3-trichloropropene is added. The excess ethanol serves as a solubilizing diluent for the reaction mixture. The mixture is heated at reflux until neutral, which requires about 3 hours, and is then cooled and diluted with 2 volumes of water. The resulting non-aqueous layer is separated, dried and fractionally distilled to yield first a trace of ethyl 3,3-dichloro-2-propenyl ether, and then 51 parts of the new compound, diethyl alpha-ethyl-alpha-(3,3-dichloro-2-propenyl) malonate, B. 96–97.5° C./0.5 mm.; $n_D^{20}$ 1.4661; per cent chlorine, 24.33 (theory, 23.86%).

This chemical may be used as a plasticizer for thermoplastic resins such as polyvinyl chloride. Forty parts of the chemical mixed with 60 parts of polyvinyl chloride on a hot mill produces a clear, soft, flexible, rubbery resin. Unplasticized polyvinyl chloride is hard and brittle.

The new compound can be reacted with urea in the usual manner to produce the corresponding barbiturate.

The new compound may be added to hydrocarbon lubricating oils in minor amounts of, for example, from 0.1 to 5.0% by weight, to improve the lubricating properties.

Having thus described our invention, what we claim and desire to protect by Letters Patent is:
1. A polyhalogenopropenyl derivative having the formula $$X_2C=CH-CH_2-\underset{\underset{C_2H_5}{|}}{C}(COOR)_2$$

where in X is halogen selected from fluorine, chlorine and bromine, and R is lower alkyl.

2. A polyhalogenopropenyl derivative of ethyl-malonic acid diethyl ester, having the formula $$X_2C=CH-CH_2-\underset{\underset{C_2H_5}{|}}{C}(CO-OC_2H_5)_2$$

wherein X is halogen selected from the group consisting of fluorine, chlorine and bromine.

3. As a new chemical compound, diethyl alpha-ethyl-alpha-(3,3-dichloro-2-propenyl) malonate.

ELBERT C. LADD.
MERLIN P. HARVEY.

References Cited in the file of this patent

UNITED STATES PATENTS

| Number | Name | Date |
|---|---|---|
| 1,842,293 | Shonle | Jan. 19, 1932 |
| 2,106,139 | Shonle | Jan. 18, 1938 |
| 2,290,274 | Bywater et al. | July 21, 1942 |

OTHER REFERENCES

Chem. Abst., vol. 44, p. 5349b (1950.)